Dec. 19, 1933.   K. E. LYMAN   1,940,458
BRAKE APPLYING MEANS
Original Filed Jan. 3, 1928
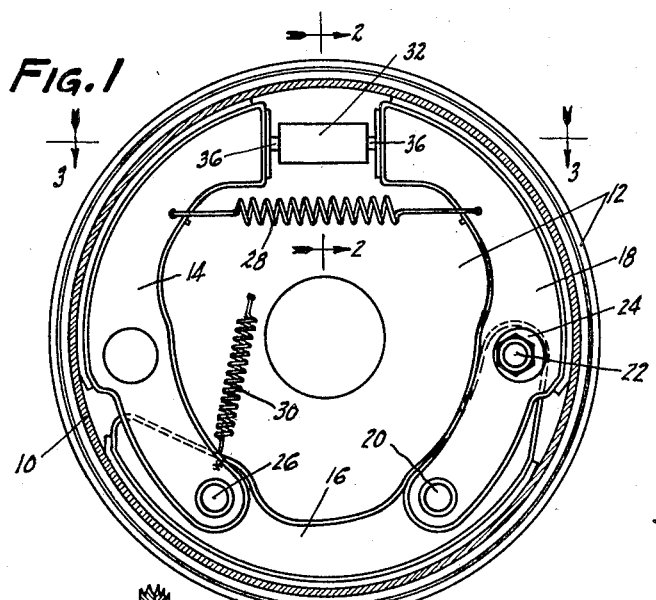
FIG.1
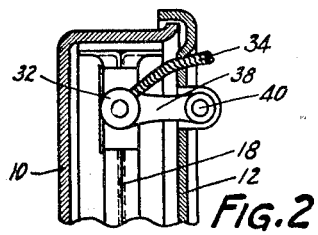
FIG.2
FIG.3
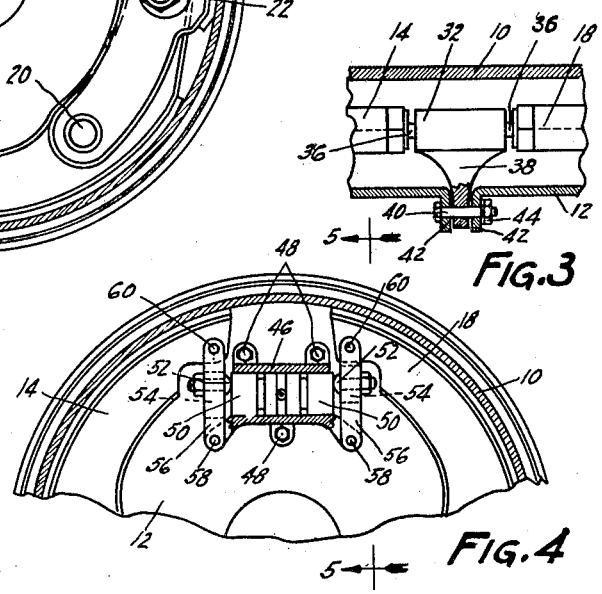
FIG.5
FIG.4
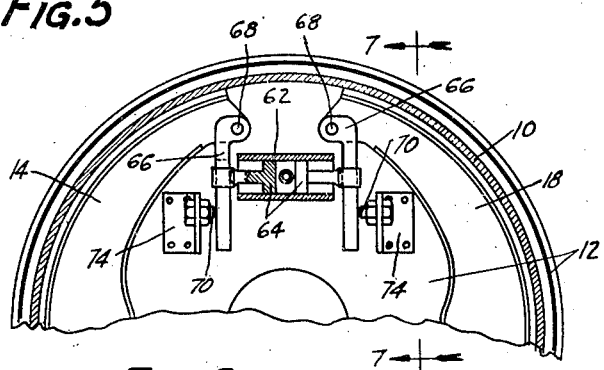
FIG.6
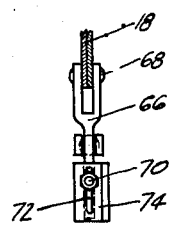
FIG.7
INVENTOR
KENNETH E. LYMAN
BY
M. W. McConkey
ATTORNEY Patented Dec. 19, 1933

1,940,458

UNITED STATES PATENT OFFICE 1,940,458

BRAKE APPLYING MEANS

Kenneth E. Lyman, Chicago, Ill., assignor to Bendix Brake Company, South Bend, Ind., a corporation of Illinois Application January 3, 1928, Serial No. 244,116
Renewed February 21, 1931

7 Claims. (Cl. 188—152)

This invention relates to brakes and is illustrated as embodied in an internal expanding brake for an automobile.

In a system of automobile brakes, it is desirable that all four of the brakes should have substantially the same retarding force, in spite of any variations in the co-efficient of friction of the lining, etc. In hydraulically operated or other fluid operated brakes, the force applied to the brakes is equalized, but this does not necessarily equalize the retarding force of the brakes because of the fact that the brakes themselves may act differently. The present invention has for its object the provision of an adjustment in a fluid operated brake of this character which will compensate for the different effectiveness of the brakes by varying the mechanical advantage of the fluid power operating device in its action on the shoes or other friction means of the brake. Preferably, the adjustment is made by setting differently an adjustable lever which can be changed to vary the mechanical advantage of the fluid-power operating device on the brake friction means. In one arrangement the lever is shifted to raise or lower the fluid power device to change the lever arm of the pivoted brake shoes themselves. In the second arrangement, the fluid-power device acts on a pair of levers which in turn act on the friction means, the effectiveness of the levers being varied either by shifting their fulcrums or by shifting the point of operative engagement of the fluid power device with the levers.

The above and other objects and features of the invention, including various novel and desirable details of construction, will be apparent from the following description of the several embodiments shown in the accompanying drawing, in which:

Figure 1 is a vertical section through the brake, just inside the head of the brake drum, and showing the brake shoes in side elevation;

Figure 2 is a partial vertical section on the line 2—2 of Figure 1 and showing the lever arranged for adjustment to raise and lower the fluid power device;

Figure 3 is a partial horizontal section substantially on the line 3—3 of Figure 1, and showing the mounting of the lever;

Figure 4 is a partial vertical section corresponding to the upper part of Figure 1 and showing a different mounting of the operating means;

Figure 5 is a partial section on the line 5—5 of Figure 4 and showing part of the operating means on a larger scale;

Figure 6 is a vertical section corresponding to Figure 4 and to the upper part of Figure 1 and showing a third form of operating means; and Figure 7 is a partial section on the line 7—7 of Figure 6 and showing the arrangement for shifting the fulcrum of one of the levers.

In the illustrative arrangements the brake includes a rotatable drum 10 at the open side of which is a backing plate 12 and within which is arranged the friction means of the brake, illustrated as three shoes 14, 16 and 18. The shoe 18 is anchored on a fixed pivot 20 passing through a relatively large opening in the web of the shoe 16, while the shoe 16 is anchored on a fixed pivot 22 passing through a relatively large opening 24 in the shoe 18. The shoe 14 is connected to the shoe 16 by a floating pivot 26. The main spring 28 urges the shoes 14 and 18 away from the drum, while an auxiliary spring 30 urges the shoe 16 away from the drum. This brake is more fully described in Patent 1,567,716, granted to Bendix Brake Company on December 29, 1925, on application of A. Y. Dodge. The present invention may be applied to brakes of various forms in addition to the particular one selected for illustration.

In the arrangement of Figures 1 to 3, the brake is applied by a fluid-power device 32 which may be in the form of the usual cylinder supplied with oil or air or other fluid under pressure through a flexible conduit 34, and which contains a pair of pistons having parts 36 in direct thrust engagement with the ends of the shoes 14 and 18. According to the present invention, this fluid power operating device is carried by a lever 38 pivoted on a bolt 40 extending between lugs 42 formed on the backing plate 12 and arranged to be clamped in any desired position of angular adjustment by a nut 44 on the bolt 40. By adjusting the lever 38 angularly the fluid power device 32 may be raised and lowered to change its vertical position with respect to the pivots 20 and 26, and thereby change its mechanical advantage in acting on the friction means of the brake.

In the arrangement of Figures 4 and 5, the fluid power device includes a cylinder 46 secured by bolts 48 to the backing plate 12, and containing a pair of pistons 50 engaging thrust members 52 adjustably secured in slots 54 in levers 56 fulcrumed on pivots 58 carried by the cylinder 46 at the lower ends of the levers, and connected to the friction means 14—18 at their upper ends by pivots 60. It will be seen that by raising and lowering the members 52 the mechanical effect of the fluid-power device acting through the levers on the friction means will be changed to adjust the brake.

In the arrangement of Figures 6 and 7 there is a cylinder 62 carried by the backing plate 12 and containing operating pistons 64 which engage levers 66 pivoted at 68 at their upper ends to the shoes 14 and 18 respectively, and fulcrumed at their lower ends by engagement with stops 70 in the form of bolts adjustably secured in slots 72 in brackets 74 secured to the backing plate 12. In this case, the fulcrums 70 are raised and lowered to change the effect of the levers, as explained above.

While several illustrative embodiments have been described in detail, it is not my intention to limit the scope of the invention to those particular embodiments or otherwise than by the terms of the appended claims.

I claim:

1. A brake comprising, in combination, a friction device, a fluid power operator adjacent said device, a lever through which said power device acts on the friction device, and a fulcrum for the lever, which is adjustable to vary the mechanical effect of the lever.

2. A brake comprising, in combination, a friction device, a fluid power operator adjacent said device, a lever through which said power operator acts on the friction device and which is mounted on a fixed fulcrum, a slot in said lever, a pin passing through said slot and adjustably secured to said lever, said pin adapted to receive the thrust of said fluid power operator in the application of the friction device.

3. A brake comprising, in combination, a drum, a friction device within said drum, and means for moving said friction device into contact with said drum comprising a fluid power device within said drum, a power transmitting means through which said power device operates the friction device, and adjustable means cooperating with the power transmitting means and movable lengthwise thereof to a series of points to vary to a substantial degree the mechanical effect of the power multiplying means.

4. A brake comprising, in combination, a drum, a pair of brake shoes mounted in said drum, a fluid power device adjacent to said drum, a power transmitting means, means connecting said power transmitting means to said shoes through which said power device operates said shoes, and adjustable means cooperating with said power transmitting means and movable lengthwise thereof to a series of points to vary to a substantial degree the mechanical effect of the power multiplying means.

5. A brake comprising, in combination, a drum, a pair of brake shoes in said drum, a fluid power device adjacent to said drum, a power transmitting means pivotally secured to one of said shoes through which said power device operates said shoe, and adjustable means cooperating with said power transmitting means and movable lengthwise thereof to a series of points to vary to a substantial degree the mechanical effect of the power transmitting means.

6. A brake comprising, in combination, a brake drum, a friction device mounted in said drum, a fluid power operator adjacent to said drum, a pair of levers connected to said power operator and to opposite ends of said friction device, together with adjustable means cooperating with said levers and movable lengthwise thereof to a series of points to vary to a substantial degree the mechanical effect of said levers.

7. A brake comprising, in combination, a drum, a friction device within said drum, and means for moving said friction device into contact with said drum comprising a fluid power device within said drum, a power transmitting means through which said power device operates said friction device, and adjustable means for connecting said fluid power device with the power transmitting means and movable lengthwise of said power transmitting means to vary the mechanical effect of the power multiplying means.

KENNETH E. LYMAN.